3,756,772
DYEING POLYESTER FIBER WITH AN AQUEOUS PREPARATION OF 1 - AMINO - 4-HYDROXY-2-(4-METHYLMERCAPTOPHENOXY) - ANTHRAQUINONE AND RESULTANT COMPOSITION
Wilhelm Gohrbandt and Jurgen Schulze, Leverkusen, and Reinhold Hornle, Cologne, and Jurgen Schneider, Leverkusen, Germany, assignors to Bayer Aktiengesellschaft, Leverkusen, Germany
No Drawing. Filed July 22, 1971, Ser. No. 165,403
Claims priority, application Germany, July 22, 1970, P 20 36 311.5
Int. Cl. C09b 1/08; D06p 1/20
U.S. Cl. 8—39
2 Claims

ABSTRACT OF THE DISCLOSURE

A process for the dyeing of synthetic and semi-synthetic materials by using 1-amino - 4 - hydroxy-2-(4'-methylmercapto-phenoxy)-anthraquinone having lattice plane spacings of 13.14 A., 3.37 A. and 4.28 A.

---

The subject of the invention is the use of 1-amino-4-hydroxy - 2 - (4' - methylmercapto - phenoxy)-anthraquinone, having lattice plane spacings of 13.14 A.; 3.37 A.; 3.28 A., for dyeing synthetic and semi-synthetic fibre materials. The invention also relates to dyeing preparations which contain the above mentioned dyestuff.

The 1-amino - 4 - hydroxy - 2 - (4'-methylmercaptophenoxy)-anthraquinone used according to the invention is characterised by the lattice plane spacings of the dyestuff molecules in the crystal structure, as obtained from the Debye-Scherrer X-ray diagrams (wavelength 1.54 A. of the Cu-Kα-radiation). The lattice plane spacings indicated are calculated from the three strongest lines of the Debye-Scherrer diagram.

1 - amino - 4 - hydroxy - 2 - (4' - methylmercaptophenoxy)-anthraquinone can be manufacture according to Example 2 of German Pat. 1,173,602 by reaction of 1 - amino - 2 - bromo - 4 - hydroxy-anthraquinone with 4-methylmercapto-phenol.

The dyestuff modification which is used according to the invention can—like the hitherto known modification which is not a stable dye—be converted to a very finely divided state by customary mechanical processes, optionally in the presence of water and, if desired, in the presence of suitable dispersing agents and customary additives such as frostproofing agents, buffer substances, protective colloids or small amounts of solvents. The customary devices, such as mills, for example ball mills, vibratory mills, sand mills or kneaders, are suitable for the fine division which may have to be carried out. Possible dispersing agents are, for example, condensation products of naphthalenesulphonic acid and formaldehyde, as well as sulphite cellulose waste lye or non-ionic and anionic surface-active compounds. The dyestuff modification used according to the invention, converted to a very finely divided state, is outstandingly suitable for dyeing synthetic or semisynthetic fibre materials at temperatures of up to about 140° C., without displaying the disadvantages of the unstable modification of the said dyestuff, obtainable according to Example 2 of German patent specification 1,173,602, which frequently yields non-uniform dyeings in dyeing processes in which it is exposed to a fairly high temperature in an aqueous medium for a fairly long time. Such dyeings are, for example, obtained in all cases where the dyeing liquor is only exhausted slowly or where such a large excess of dyestuff is used that the dyebath is never exhausted, for example in dyeing loose material or rovings in circulation liquor equipment, as in the case of spinning baths, tops or yarns dyed by pack dyeing, or in the case of cheese dyeing.

The dyestuff modification used according to the invention is a stable dye within the individual particles, that is to say it does not undergo any further change in crystal structure under the dyeing conditions which are customary for dispersion dyestuffs, that is to say in an aqueous medium at temperatures of up to 140° C., optionally in the presence of customary dyeing auxiliaries; its crystal shape and crystal size changes only in such a way that the dyeing properties are not adversely affected.

To manufacture the dyestuff used according to the invention, it is convenient to start from the molten mixture, at a temperature of 145–150° C., which is obtained according to Example 2 of German Pat. 1,173,602, and to cool it to 80–110° C., preferably 80–100° C., and particularly preferentially to 95 to 100° C. When using isolated 1-amino - 4 - hydroxy - 2 - (4'-methylmercaptophenoxy)-anthraquinone which is not a stable dye for converting it into its stable modification, the substance is dissolved in a melt of 4-methyl-mercapto-phenol. The whole is mixed with water, one or more organic solvents or a mixture of water and organic solvents in such a way that the temperature does not drop below the lower limits given above. When using methanol as a solvent, it is also possible to control the speed of its addition in such a way that gentle boiling and refluxing occurs constantly; a hazard from solvent vapours does not arise on careful working. The organic solvent suitable for this purpose can be miscible or immiscible with water; as regards their boiling characteristics they can, in accordance with the customary classification ("Lösungsmittel Hoechst" ("Hoechst Solvents"), Frankfurt/Main-Hoechst, 4th. edition, 1966) belong to the group of the low-boiling solvents, that is to say boiling point below 100° C., the group of the medium-boiling solvents, that is to say boiling point between 100 and 150° C., and the group of the high-boiling solvents, that is to say boiling point above 150° C.

Under a different classification, the preferentially usable organic solvents can be subdivided as follows:

(1) Hydrocarbons, such as benzine, benzene and toluene;

(2) Halogenated hydrocarbons, such as chloroform, carbon tetrachloride, chlorobenzene, o - dichlorobenzene, m-dichlorobenzene, p-dichlorobenzene o-chlorotoluene, m-chlorotoluene and p-chlorotoluene;

(3a) Monohydric alcohols, such as methanol, ethanol, n-propanol, iso-propanol, n-butanol, iso-butanol, n-pentanol, iso-amyl alcohol, n-hexanol and cyclohexanol;

(3b) Polyhydric alcohols, such as ethylene glycol, propylene glycol and glycerol;

(4) Glycol ethers, such as ethylene glycol monoethyl ether, ethylene glycol monobutyl ether and diethylene glycol monomethyl ether;

(5) Esters, such as acetic acid ethyl ester and acetic acid methyl ester;

(6) Ketones, such as acetone and butanone-2;

(7) Nitrogen-containing compounds, such as nitrobenzene and N,N-dimethylformamide.

In detail, solvent is added until a sample under the microscope substantially only still shows red-violet needles (of the modification used according to the invention); only isolated coarse pinkish-red crystals (of the known modification) are then still present.

A further test method, for examining whether the addition of solvent can be stopped, is to record Debye-Scherrer diagrams; the point at which the addition of solvent can be stopped is recognisable from the lines of the known crystal modification having largely disappeared and the appearance of lines of the modification according to the invention.

It is found that towards the end of the addition of the solvent, the ratio of 4-methylmercapto-phenol employed to solvent is about 10–70 parts by weight to 0.5–20 parts by weight, preferably 30–50 parts by weight to 1–12 parts by weight.

At times it can be desirable, in order to reduce the proportion of previously known crystal modification, to subject the mixture of 1-amino-4-hydroxy-2-(4'-methyl-mercaptophenoxy)-anthraquinone, 4-methylmercaptophenol and solvent, thus obtained, to a further heat treatment, that is to say to stir the whole for some time longer (about ½ hour to 4 hours, preferably about 1 hour to 3 hours) while maintaining the temperature range indicated for the addition of solvent.

The end of the heat treatment can again be detected under the microscope from Debye-Scherrer diagrams.

The conversion of the crystallographic modification of 1-amino - 4 - hydroxy - 2 - (4'-methylmercapto-phenoxy)-anthraquinone which is not stable to the dyeing process, and which has lattice plane spacings of 15.15 A.; 5.20 A.; 3.80 A.—as is produced according to Example 2 of the German Pat. 1,173,602—into the crystallographic modification which is stable to the dyeing process and has lattice plane spacings of 13.14 A.; 3.37 A.; 3.28 A., can also be effected in a manner which is in itself known by grinding with salt, for example by grinding the dyestuff with major amounts of inorganic salts, such as $Na_2SO_4$ or NaCl, in the presence of minor amounts of water, silicone oil, organic solvents or their mixtures for several hours, preferably 10–20 hours.

The organic solvents which are suitable for this purpose can be miscible or immiscible with water; as regards their boiling characteristics they can, in accordance with the customary classification (Lösungsmittel H o e c h s t ("Hoechst Solvents"), Frankfurt/Main-Hoechst, 4th edition, 1966) belong to the group of the low-boiling solvents, that is to say boiling point below 100° C., the group of the medium-boiling solvents, that is to say boiling point between 100 and 150° C., and the group of high-boiling solvents, that is to say boiling point above 150° C.

Under a different classification, the preferentially usable organic solvents can be subdivided as follows:

(1) Hydrocarbons, such as benzine, benzene and toluene;

(2) Halogenated hydrocarbons, such as chloroform, carbon tetrachloride, chlorobenzene, o-dichlorobenzene, m-dichlorobenzene, p-dichlorobenzene, o-chlorotoluene, m-chlorotoluene and p-chlorotoluene;

(3) Monohydric alcohols, such as methanol, ethanol, n-propanol, iso-propanol, n-butanol, iso-butanol, n-pentanol, iso-amyl alcohol, n-hexanol and cyclohexanol;

(3b) Polyhydric alcohols, such as ethylene glycol, propylene glycol and glycerol;

(4) Glycol ethers, such as ethylene glycol monobutyl ether, and diethylene glycol monomethyl ether;

(5) Esters, such as acetic acid ethyl ester and acetic acid methyl ester;

(6) Ketones, such as acetone and butanone-2;

(7) Nitrogen-containing compounds, such as nitrobenzene and N,N-dimethylformamide.

The end point of the salt grinding process can be determined microscopically or by the Debye-Scherrer diagram—as described above.

The parts quoted in the examples are parts by weight. The lattice plane spacings, given in A., were calculated from the three strongest lines in the Debye-Scherrer diagram.

EXAMPLE 1

A solution of 20 parts of 1-amino-4-hydroxy-2-(4'-methylmercapto-phenoxy)-anthraquinone in 50 parts of 4-methylmercaptophenol at 145–150° C., as is obtained in the preparation according to German patent specification 1,173,602, is cooled to 100–95° C.

The reaction mixture is treated with methanol over the course of one hour, while stirring and keeping the temperature constant at 100–95° C.; this was done in such a way that after the end of one hour the weight ratio 4-methylmercaptophenol:methanol is 50:12. The reaction mixture is stirred for a further hour at 100–95° C. The dyestuff which precipitates under these conditions is isolated.

EXAMPLE 2

A solution of 20 parts of 1-amino-4-hydroxy-2-(4'-methylmercapto-phenoxy)-anthraquinone in 40 parts of p-methylmercaptophenol at 145–150° C., as is obtained in the preparation according to German patent specification 1,173,602, is cooled to 100–95° C. The reaction mixture is treated with methanol over the course of 15 minutes, whilst stirring and keeping the temperature constant at 100–95° C.; this was done in such a way that after the end of 15 minutes the weight ratio 4-methylmercaptophenol:methanol is 40:4. The reaction mixture is stirred for a further hour at 100–95° C. The dyestuff which precipitates under these conditions is isolated.

EXAMPLE 3

A solution of 20 parts of 1-amino-4-hydroxy-2-(4'-methylmercapto-phenoxy)-anthraquinone in 40 parts of 4-methylmercaptophenol at 145–150° C. is cooled to 100–95° C. The reaction mixture is treated with methanol over the course of 1 hour, whilst stirring and keeping the temperature constant at 100–95° C., in such a way that after the end of one hour the weight ratio 4-methylmercaptophenol:methanol is 40:12. The dyestuff precipitated in this way is isolated.

EXAMPLE 4

A solution of 20 parts of 1-amino-4-hydroxy-2-(4'-methylmercapto-phenoxy)-anthraquinone in 50 parts of 4-methylmercaptophenol at 145–150° C. is cooled to 100–95° C. The reaction mixture is treated with methanol over the course of 1 hour, whilst stirring and keeping the temperature constant at 100–95° C., in such a way that after the end of one hour the weight ratio of 4-methylmercaptophenol:methanol is 50:12. The dyestuff precipitated in this way is isolated.

EXAMPLE 5

A solution of 20 parts of 1-amino-4-hydroxy-2-(4'-methylmercapto-phenoxy)-anthraquinone in 50 parts of 4-methylmercaptophenol at 145–150° C. is cooled to 100–95° C. The reaction mixture is treated with ethanol over the course of 1 hour, whilst stirring and keeping the temperature constant at 100–95° C., in such a way that after the end of one hour the weight ratio of 4-methylmercaptophenol:ethanol is 50:12. The dyestuff precipitated in this way is isolated.

EXAMPLE 6

A solution of 20 parts of 1-amino-4-hydroxy-2-(4'-methylmercapto-phenoxy)-anthraquinone in 40 parts of 4-methylmercaptophenol at 145–150° C. is cooled to 100–95° C. The reaction mixture is treated with ethanol over the course of 1 hour, whilst stirring and keeping the temperature constant at 100–95° C., in such a way that after the end of one hour the weight ratio of 4-methylmercaptophenol:ethanol is 40:12. The dyestuff precipitated in this way is isolated.

EXAMPLE 7

A solution of 20 parts of 1-amino-4-hydroxy-2-(4'-methylmercapto-phenoxy)-anthraquinone in 40 parts of 4-methylmercaptophenol at 145–150° C. is cooled to 100–95° C. The reaction mixture is treated with n-propanol over the course of 1 hours, whilst stirring and keeping the temperature constant at 100–95° C., in such a way that after the end of one hour the weight ratio of 4-methylmercaptophenol:n-propanol is 40:12. The dyestuff precipitated in this way is isolated.

EXAMPLE 8

A solution of 20 parts of 1-amino-4-hydroxy-2-(4'-methylmercapto-phenoxy-)-anthraquinone in 50 parts of 4-methyl-mercaptophenol at 145–150° C. is cooled to 100–95° C. The reaction mixture is treated with n-propanol over the course of 1 hour, whilst stirring and keeping the temperature constant at 100–95° C., in such a way that after the end of one hour the weight ratio of 4-methylmercaptophenol:n-propanol is 50:12. The dyestuff precipitated in this way is isolated.

EXAMPLE 9

A solution of 20 parts of 1-amino-4-hydroxy-2-(4'-methylmercapto-phenoxy)-anthraquinone in 50 parts of 4-methylmercaptophenol at 145–150° C. is cooled to 100–95° C. The reaction mixture is treated with iso-propanol over the course of 1 hour, whilst stirring and keeping the temperature constant at 100–95° C., in such a way that after the end of one hour the weight ratio of 4-methylmercaptophenol:iso-propanol is 50:12. The dyestuff precipitated in this way is isolated.

EXAMPLE 10

A solution of 20 parts of 1-amino-4-hydroxy-2-(4'-methylmercapto-phenoxy)-anthraquinone in 40 parts of 4-methylmercaptophenol at 145–150° C. is cooled to 100–95° C. The reaction mixture is treated with isopropanol over the course of 1 hour, whilst stirring and keeping the temperature constant at 100–95° C., in such a way that after the end of one hour the weight ratio of 4-methylmercaptophenol:isopropanol is 40:12. The dyestuff precipitated in this way is isolated.

EXAMPLE 11

A solution of 20 parts of 1-amino-4-hydroxy-2-(4'-methylmercapto-phenoxy)-anthraquinone in 40 parts of 4-methylmercaptophenol at 145–150° C. is cooled to 100–95° C. The reaction mixture is treated with n-butanol over the course of 1 hour, whilst stirring and keeping the temperature constant at 100–95° C., in such a way that after the end of one hour the weight ratio of 4-methylmercaptophenol:n-butanol is 40:12. The dyestuff precipitated in this way is isolated.

EXAMPLE 12

A solution of 20 parts of 1-amino-4-hydroxy-2-(4'-methylmercapto-phenoxy)-anthraquinone in 50 parts of 4-methylmercaptophenol at 145–150° C. is cooled to 100–95° C. The reaction mixture is treated with n-butanol over the course of 1 hour, whilst stirring and keeping the temperature constant at 100–95° C., in such a way that after the end of one hour the weight ratio of 4-methylmercaptophenol:n-butanol is 50:12. The dyestuff precipitated in this way is isolated.

EXAMPLE 13

A solution of 20 parts of 1-amino-4-hydroxy-2-(4'-methylmercapto-phenoxy)-anthraquinone in 50 parts of 4-methylmercaptophenol at 145–150° C. is cooled to 100–95° C. The reaction mixture is treated with iso-butanol over the course of 1 hour, whilst stirring and keeping the temperature constant at 100–95° C., in such a way that after the end of one hour the weight ratio of 4-methylmercaptophenol:iso-butanol is 50:12. The dyestuff precipitated in this way is isolated.

EXAMPLE 14

A solution of 20 parts of 1-amino-4-hydroxy-2-(4'-methylmercapto-phenoxy)-anthraquinone in 40 parts of 4-methylmercaptophenol at 145–150° C. is cooled to 100–95° C. The reaction mixture is treated with iso-butanol over the course of 1 hour, whilst stirring and keeping the temperature constant at 100–95° C., in such a way that after the end of one hour the weight ratio of 4-methylmercaptophenol:iso-butanol is 40:12. The dyestuff precipitated in this way is isolated.

EXAMPLE 15

A solution of 20 parts of 1-amino-4-hydroxy-2-(4'-methylmercapto-phenoxy)-anthraquinone in 40 parts of 4-methylmercaptophenol at 145–150° C. is cooled to 100–95° C. The reaction mixture is treated with a mixture of 50 percent by weight of methanol and 50 percent by weight of iso-butanol over the course of 1 hour, whilst stirring and keeping the temperature constant at 100–95° C., in such a way that after the end of one hour the ratio of 4-methylmercaptophenol:methanol/iso-butanol mixture is 40:12. The dyestuff is precipitated in this way is isolated.

EXAMPLE 16

A solution of 20 parts of 1-amino-4-hydroxy-2-(4'-methylmercapto-phenoxy)-anthraquinone in 50 parts of 4-methylmercaptophenol at 145–150° C. is cooled to 100–95° C. The reaction mixture is treated with a mixture of 50 percent by weight of methanol and 50 percent by weight of isobutanol over the course of 1 hour, whilst stirring and keeping the temperature constant at 100–95° C., in such a way that after the end of one hour the weight ratio of 4-methylmercaptophenol:methanol/iso-butanol mixture is 50:12. The dyestuff precipitated in this way is filtered off.

EXAMPLE 17

A solution of 20 parts of 1-amino-4-hydroxy-2-(4'-methylmercapto-phenoxy)-anthraquinone in 50 parts of 4-methylmercaptophenol at 145–150° C. is cooled to 100–95° C. The reaction mixture is treated with water over the course of 1 hour, whilst stirring and keeping the temperature constant at 100–95° C., in such a way that after the end of one hour the weight ratio of 4-methylmercaptophenol:water is 50:50. Thereafter this reaction mixture is stirred for a further hour at 95–100° C., in the course of which the viscosity increases greatly. The dyestuff which precipitates under these conditions is isolated.

EXAMPLE 18

A solution of 20 parts of 1-amino-4-hydroxy-2-(4'-methylmercapto-phenoxy)-anthraquinone in 40 parts of 4-methylmercaptophenol at 145–150° C. is cooled to 100–95° C. The reaction mixture is treated with water over the course of 1 hour, whilst stirring and keeping the temperature constant at 100–95° C., in such a way that after the end of one hour the weight ratio of 4-methylmercaptophenol:water is 40:50. Thereafter this reaction mixture is stirred for a further hour at 95–100° C., in the course of which the viscosity increases greatly. The dyestuff which precipitates under these conditions is isolated.

EXAMPLE 19

A solution of 20 parts of 1-amino-4-hydroxy-2-(4'-methylmercapto-phenoxy)-anthraquinone in 50 parts of 4-methylmercaptophenol at 145–150° C. is cooled to 100–95° C. The reaction mixture is treated with a mixture of 50 percent by weight of water and 50 percent by weight of n-butanol over the course of one hour, whilst stirring and keeping the temperature constant at 100–95° C., in such a way that after the end of one hour the weight ratio of 4-methylmercaptophenol:water/n-butanol mixture is 50:50. Thereafter this reaction mixture is stirred for a further hour at 95–100° C., in the course of which the viscosity increases greatly. The dyestuff which precipitates under these conditions is isolated.

EXAMPLE 20

A solution of 20 parts of 1-amino-4-hydroxy-2-(4'-methylmercapto-phenoxy)-anthraquinone in 40 parts of 4-methylmercaptophenol at 145–150° C., is cooled to 100–95° C. The reaction mixture is treated with a mixture of 50 percent by weight of water and 50 percent by weight of n-butanol over the course of one hour, whilst stirring and keeping the temperature constant at 100–95° C., in such a way that after the end of one hour the weight ratio of 4-methylmercaptophenol:water/n-butanol mixture is 40:50. Thereafter this reaction mixture is stirred for a further hour at 95–100° C., in the course of which the viscosity increases greatly. The dyestuff which precipitates under these conditions is isolated.

EXAMPLE 21

A solution of 20 parts of 1-amino-4-hydroxy-2-(4'-methylmercapto-phenoxy)-anthraquinone in 40 parts of 4-methylmercaptophenol at 145–150° C. is cooled to 100–95° C. The reaction mixture is treated, over the course of 15 minutes, whilst stirring, with the parts of solvent designated (a) in the table below, and the mixture is stirred at 100–95° C. over the course of the number of hours designated (b) in the table below. The dyestuff which precipitates under these conditions is isolated.

TABLE

| Solvent | (a) Parts | (b) Time of heating |
|---|---|---|
| Chloroform | 3.0 | 2.0 |
| Carbon tetrachloride | 8.0 | 3.0 |
| Benzine | 4.0 | 2.0 |
| Benzene | 4.5 | 2.0 |
| Nitrobenzene | 5.0 | 2.0 |
| Chlorobenzene | 3.0 | 2.0 |
| o-Dichlorobenzene | 5.0 | 2.0 |
| m-Dichlorobenzene | 5.0 | 2.0 |
| p-Dichlorobenzene | 5.0 | 2.0 |
| Toluene | 9.0 | 3.0 |
| Chlorotoluene, (o), (m), (p) | 2.0 | 3.0 |
| Ethylene glycol | 1.7 | 1.0 |
| Diethylene glycol | 2.0 | 2.0 |
| Glycerol | 2.0 | 2.0 |
| Ethylene glycol monobutyl ether | 2.0 | 1.5 |
| Diethylene glycol monomethyl ether | 2.0 | 2.0 |
| Dimethylformamide | 1.0 | 1.0 |
| Acetone | 1.0 | 2.0 |
| Acetic acid ethyl ester | 1.5 | 2.0 |

EXAMPLE 22

12.0 parts of 1-amino-4-hydroxy-2-(4'-methylmercapto-phenoxy)-anthraquinone are ground dry with 160 parts of $Na_2SO_4$, in the presence of 0.25 part of silicone oil and 1.5 parts of white spirit, for 15 hours at room temperature (20–25° C.) in a mill. The dyestuff produced under these conditions is isolated.

X-ray structure analysis, by means of CuKα-radiation of the products obtained in Examples 1–22:

Intensities I: Lattice plane spacings (A.)
100 .................................................. 13.14
95 ................................................... 3.37
85 ................................................... 3.28

After isolation, the dyestuff is converted into a dispersion by means of the usual wet comminution processes, in the presence of surface-active agents.

The dyestuff reduced to a finely divided form in accordance with customary methods yields level dyeings when polyester fibres are dyed in the usual manner.

EXAMPLE 23

Continuous process

A woven fabric of polyester fibres is impregnated on a padder with a liquor which per litre contains 20 g. of the new crystallographic modification, according to the invention, of the dyestuff 1-amino-4-hydroxy-2-(4'-methyl-mercapto-phenoxy)-anthraquinone, having lattice plane spacings of 13.14 A.; 3.37 A.; 3.28 A.—in a processed form—and 10 g. of a thermosol auxiliary, especially a polyether. The woven fabric is then squeezed out to a weight increase of 40–70%, and is dried in fluidising jet drier or in a drying cabinet at 80 to 120° C. Thereafter, the fabric is treated with hot air for about 45 to 60 seconds, at 190 to 200° C., in a stenter frame or nozzle hot flue and is then rinsed, subjected to a reductive after-treatment if appropriate, washed, rinsed and dried. The reductive after-treatment to remove the proportion of dyestuff which adheres superficially to the fibres can be carried out by introducing the fabric, at 25° C., into a liquor containing 3 to 5 cm.³/l. of sodium hydroxide solution of 38° Bé. and 1 to 2 g./l. of hydrosulphite (concentrated), heating the whole to 70° C. over the course of about 15 to 20 minutes, and leaving it at 70° C. for a further 10 minutes. Thereafter the fabric is rinsed hot, acidified with 2 to 3 cm.³/l. of 85% strength acetic acid at 50° C., rinsed and dried. A full red dyeing is obtained, which is distinguished by high dyestuff yield and build-up capacity, as well as by very good fastness properties.

EXAMPLE 24

HT-dyeing on cheese-dyeing apparatus

A pre-cleaned cheese (400 g., continuous-filament Diolen) is introduced into a cheese-dyeing apparatus (10 litres) and a liquor which per litre contains 0.7 g. of the new crystallographic modification, according to the invention, of the dyestuff 1-amino-4-hydroxy-2-(4'-methyl-mer-capto-phenoxy)-anthraquinone, having lattice plane spacings of 13.14 A.; 3.37 A.; 3.28 A.—present in a processed form—and 2 g. of a dyeing auxiliary and 2 g. of monosodium phosphate, is pumped through the cheese for 5 minutes. Thereafter, the liquor is adjusted to pH=4.5–5.0 with acetic acid (60% strength), heated to 125° C. over the course of 20 minutes, whilst pumping liquor through the cheese, and dyeing is then carried out for one hour at 125° C. and a pressure of approx. 3 atmospheres gauge, and is followed by rinsing, a reductive after-treatment if appropriate, rinsing and drying. A red dyeing having very good fastness properties is obtained.

What is claimed is:

1. A composition consisting essentially of an aqueous preparation of 1-amino-4-hydroxy-2-(4'-methylmercapto-phenoxy)-anthraquinone having lattice plane spacings of 13.14 A.; 3.37 A. and 3.28 A.

2. Polyester fiber dyed with the aqueous dyeing preparation of claim 1.

References Cited

UNITED STATES PATENTS 3,510,243    5/1970    Seufet et al. .............. 8—39

FOREIGN PATENTS 1,173,602    7/1964    Germany ............ 260—380

OTHER REFERENCES

Milicevic, Textile Chem. & Colorist, vol. 2 (5), March 1970, pp. 17–20.

GEORGE F. LESMES, Primary Examiner

P. C. IVES, Assistant Examiner

U.S. Cl. X.R.

8—85, 93, 94, 92, 174; 260—380